United States Patent [19]

Russell

[11] 4,349,357

[45] Sep. 14, 1982

[54] APPARATUS AND METHOD FOR FRACTIONATING AIR AND OTHER GASEOUS MIXTURES

[75] Inventor: George K. Russell, Castle Rock, Colo.

[73] Assignee: Stanley Aviation Corporation, Denver, Colo.

[21] Appl. No.: 161,690

[22] Filed: Jun. 23, 1980

[51] Int. Cl.³ ............................................. B01D 53/04
[52] U.S. Cl. ......................................... 55/21; 55/62; 55/68; 55/75; 55/163; 55/179; 55/389
[58] Field of Search .................. 55/21, 25, 26, 33, 58, 55/62, 68, 74, 75, 163, 179, 198, 397, 389; 137/493.1, 550, 860

[56] References Cited

U.S. PATENT DOCUMENTS

| | | | |
|---|---|---|---|
| 2,944,627 | 7/1960 | Skarstrom | 55/58 X |
| 3,069,830 | 12/1962 | Skarstrom et al. | 55/58 |
| 3,086,339 | 4/1963 | Skarstrom et al. | 55/26 |
| 3,101,261 | 8/1963 | Skarstrom | 55/58 |
| 3,102,013 | 8/1963 | Skarstrom | 55/31 |
| 3,104,162 | 9/1963 | Skarstrom | 55/58 |
| 3,138,439 | 6/1964 | Skarstrom | 55/33 |
| 3,142,547 | 7/1964 | Marsh et al. | 55/26 |
| 3,144,314 | 8/1964 | Jackson | 55/179 |
| 3,149,934 | 9/1964 | Martin | 55/58 |
| 3,155,110 | 11/1964 | Hoffman | 137/550 X |
| 3,182,435 | 5/1965 | Axt | 55/162 |
| 3,192,686 | 7/1965 | Berkey et al. | 55/21 |
| 3,225,518 | 12/1965 | Skarstrom et al. | 55/58 X |
| 3,237,377 | 3/1966 | Skarstrom | 55/25 |
| 3,252,268 | 5/1966 | Stark | 55/25 |
| 3,263,400 | 8/1966 | Hoke et al. | 55/33 |
| 3,280,536 | 10/1966 | Berlin | 55/58 |
| 3,282,028 | 11/1966 | Berlin | 55/75 X |
| 3,313,091 | 4/1967 | Berlin | 55/58 |
| 3,323,291 | 6/1967 | Kern | 55/179 X |
| 3,323,292 | 6/1967 | Brown | 55/162 |
| 3,338,030 | 8/1967 | Feldbauer, Jr. | 55/25 |
| 3,430,418 | 3/1969 | Wagner | 55/25 |
| 3,659,399 | 5/1972 | Kauer, Jr. et al. | 55/62 X |
| 3,738,087 | 6/1973 | McCombs | 55/58 |
| 3,778,967 | 12/1973 | Kauer, Jr. et al. | 55/33 X |
| 3,788,036 | 1/1974 | Lee et al. | 55/25 |
| 3,800,507 | 4/1974 | Howell et al. | 55/179 X |
| 3,880,616 | 4/1975 | Myers et al. | 55/179 X |
| 3,891,411 | 6/1975 | Meyer | 55/58 X |
| 3,902,875 | 9/1975 | Bridigum et al. | 55/179 X |
| 3,923,477 | 12/1975 | Armond et al. | 55/25 |
| 4,007,021 | 2/1977 | Gyllinder | 55/33 |
| 4,065,272 | 12/1977 | Armond | 55/25 |
| 4,101,298 | 7/1978 | Myers et al. | 55/163 |
| 4,144,037 | 3/1979 | Armond et al. | 55/58 |
| 4,162,146 | 7/1979 | Seibert | 55/163 |
| 4,190,424 | 2/1980 | Armond et al. | 55/58 |
| 4,197,095 | 4/1980 | White, Jr. et al. | 55/21 X |
| 4,231,768 | 11/1980 | Seibert et al. | 55/179 |

OTHER PUBLICATIONS

Griesmer et al., Latest Advances in Selective Adsorption, *Petroleum Refiner*, Jun. 1960, pp. 125-132, vol. 39, No. 6.
Oxygen Separation by Pressure Swing Separation, 2 pages.
The New Twist on Homemade Oxygen: Precise Flow at the Turn of a Dial, Bendix, 3 pages, Publication No. 10323.
The New De Vo₂ Oxygen Concentrator Model 955, DeVilbiss, 1 page.
Introducing the LINDE Oxygen Concentrator LOC II, Union Carbide, 4 pages, 11/78.
Econo₂ Oxygen Concentrator, Maintain Medical Equipment, Inc., 4 pages.
The Briox Oxy-Concentrator, Briox Technologies, 2 pages.

*Primary Examiner*—Robert H. Spitzer
*Attorney, Agent, or Firm*—LeBlanc, Nolan, Shur & Nies

[57] ABSTRACT

A heatless fractionating apparatus and method wherein a pressurized gaseous mixture, such as air, is alternately passed through first and second adsorbent beds for adsorbing at least a first component but not a second component of the gaseous mixture, and wherein each adsorbent bed is purged of the adsorbed component during the intervals in which the gaseous mixture is not passed through it. A valve system for each adsorbent bed comprises a pressure-responsive valve which responds to the delivery of the pressurized gaseous mixture through an electrically operated valve to deliver the gaseous mixture to its associated adsorbent bed. The pressure-responsive valve also operates to vent purge and other gases from its associated adsorbent bed when the electrically operated valve is closed to block delivery of the pressurized gaseous mixture to the pressure-responsive valve. The electrically operated valves for the two adsorbent beds are cyclically and alternately opened by a pressure-responsive control circuit, which may be equipped with one or more battery-operated alarm devices for signalling loss of electrical power and failure to switch delivery of the pressurized gaseous mixture from one bed to the other within a pre-selected time period. To quickly achieve a high concentration of the desired component in the product effluent, all of the unadsorbed gas leaving the adsorbent beds may be made available for purging the beds for a short preselected time period at start-up. Alternatively, stored unadsorbed gas may be made available to purge one or both of the beds at shutdown.

35 Claims, 8 Drawing Figures

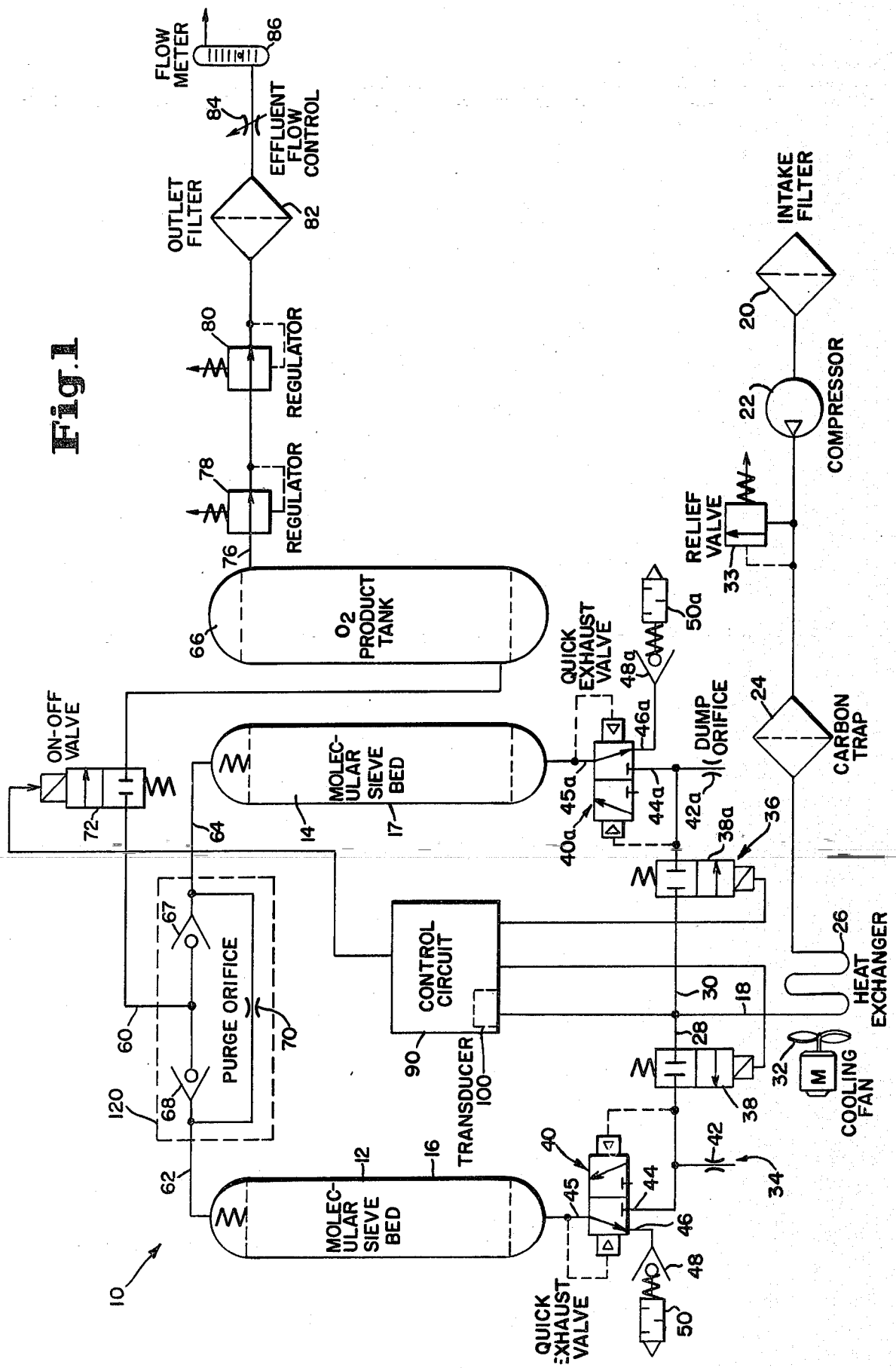

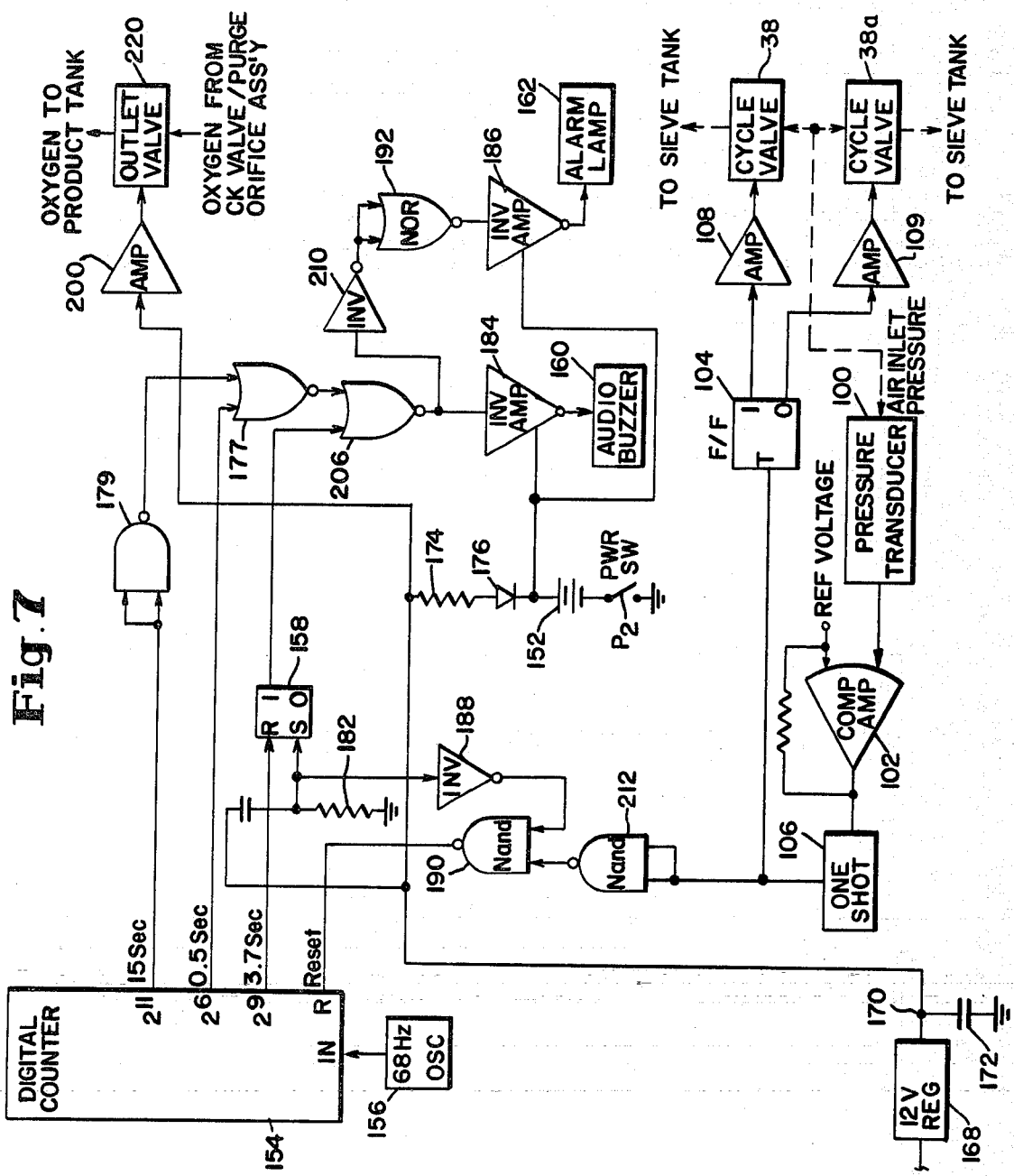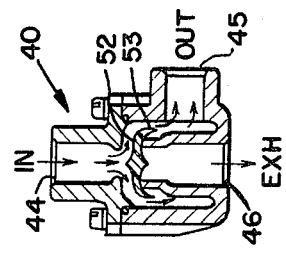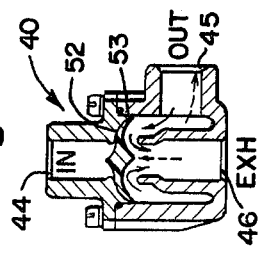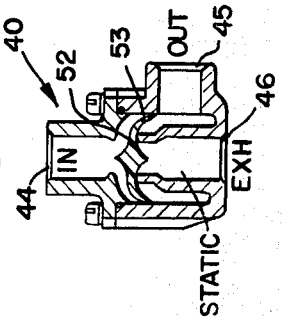

APPARATUS AND METHOD FOR FRACTIONATING AIR AND OTHER GASEOUS MIXTURES

FIELD OF INVENTION

This invention relates to apparatus and method for fractionating air and other gaseous mixtures.

BACKGROUND

Prior to this invention gaseous mixtures, such as air, have been fractionated in heatless fractionating systems by compressing or otherwise pressurizing the gaseous mixture, by passing the compressed gaseous mixture at an elevated pressure through an adsorbent to adsorb one or more components of the mixture, and by thereafter purging the adsorbed components from the adsorbent at reduced pressure. In fractionating air, the adsorbent may be selected to adsorb nitrogen, thus providing an oxygen enriched effluent for use by patients or for other purposes. Fractionating systems which produce oxygen enriched air for breathing are referred to as oxygen concentrators.

In order to establish a continuous operation in which the unadsorbed gas or product effluent is produced in an essentially uninterrupted stream, it has been the practice to use two vessels each containing the desired adsorbent, and to deliver the compressed gaseous mixture alternately to the two vessels to thus alternately pass the compressed mixture through the two bodies or beds of the adsorbent. According to this conventional practice each adsorbent bed is purged of the adsorbed components or constituents during the intervals in which the adsorbent bed is not being used to adsorb one or more components from the compressed gaseous mixture, so that each bed alternately undergoes an adsorption phase at elevated pressure and a desorption phase at reduced pressure. Purging of each adsorbent bed is conventionally accomplished by diverting a fraction of the unadsorbed gas from the bed undergoing its adsorption phase to the bed undergoing its desorption phase. Solenoid operated valves are typically used to control the delivery of the compressed gaseous mixture to the beds and the exhaust of purge gas from the beds.

Examples of the foregoing type of dual adsorbent bed system are described in U.S. Pat. No. 2,944,627 which issued on July 12, 1960, U.S. Pat. No. 3,104,162 which issued on Sept. 17, 1963, U.S. Pat. No. 3,192,686 which issued on July 6, 1965, U.S. Pat. No. 3,225,518 which issued on Dec. 28, 1965, U.S. Pat. No. 3,280,536 which issued on Oct. 25, 1966, U.S. Pat. No. 3,659,399 which issued on May 2, 1972, and U.S. Pat. No. 4,101,298 which issued on July 18, 1978.

One drawback of known, prior art systems of the foregoing type is that at start-up, it takes a significant amount of cyclic operation time to reach the maximum concentration of the key component in the unadsorbed gas or product effluent, as it is called. In prior oxygen concentrators, for example, the cyclic operation time required for reaching maximum oxygen concentration is typically from 10 to 20 minutes.

Another drawback of such dual bed fractionating systems arises from the inlet line pressure which varies from zero psig to a value at least as great as the pressure of the compressed gaseous mixture. To provide satisfactory operation at zero pressure, as well as the elevated line pressures, prior dual bed fractionating systems are customarily equipped with large-orificed, direct lift solenoid operated valves for controlling delivery of the compressed gas to the adsorbent beds. Such valves are usually very large, heavy and expensive. Furthermore, reverse exhaust flow often occurs with the large orifice valves because they are exposed to relatively high back pressures. To alleviate this problem, prior systems may, at added expense, be equipped with additional inlet check valves or a pressure tank.

A further drawback of the prior dual bed fractionating systems using solenoid operated valves is that, upon shutdown or power loss, the compressed gas may be trapped in the adsorbing bed. Such a condition tends to create a back pressure that could, upon subsequent start-up, overload the compressor which is used to compress the inlet air or other gas. Also, such a condition tends to lengthen the cyclic operating time to reach maximum key component concentration when the equipment is subsequently re-started.

Many prior dual bed systems are equipped with timers to control the cyclic operation for the adsorbent beds. Such timer controlled systems are considered to be less satisfactory than pressure controlled systems because the mass of the adsorbed component is affected primarily by the partial pressure and temperature of the adsorbed constituent. However, a pressure controlled system as proposed in the previously mentioned U.S. Pat. No. 4,101,298 is relatively complex.

SUMMARY AND OBJECTS OF INVENTION

The general aim and purpose of this invention is to simplify and improve the construction and operation of the fractionating equipment by providing a novel fractionating system which is not subject to the foregoing drawbacks of prior systems.

More particularly, an important object of this invention is to provide a novel fractionating apparatus and method, whereby the time required at start-up to attain maximum key component concentration (such as oxygen) is greatly reduced as compared with the time required to reach the same level of concentration in prior systems.

In one embodiment of this invention, the foregoing object is accomplished by utilizing all of the available unadsorbed gas or product effluent (oxygen enriched gas in the case of an oxygen concentrator) to alternately purge the adsorbent beds for a short pre-selected time period at start-up. According to another embodiment of this invention, the time required to reach maximum concentration of the oxygen or other key component in the product effluent is shortened even more by continuously storing a quantity of the product effluent in a product or storage tank during operation of the system and by utilizing the stored product effluent to purge one or both of the adsorbent beds upon shutdown, rather than making the stored product effluent available to the user after shutdown. The stored product effluent may be fed to both beds for purging both beds simultaneously upon shutdown. Alternatively, the stored product effluent may be delivered only to the adsorbent bed that was in its adsorption phase at shutdown to make more efficient use of the product effluent.

Another important object of this invention is to provide a novel heatless fractionating apparatus wherein a unique valving system is used to deliver the compressed gaseous mixture alternately to the two adsorbent beds and to vent purge gas from the beds during the intervals in which they are being purged.

According to the illustrated embodiment, the valve arrangement for each adsorbent bed comprises a single solenoid-operated valve and a pressure-responsive valve connected between the solenoid-operated valve and the adsorbent bed. The solenoid-operated valve controls the delivery of the compressed air or other gaseous mixture to the pressure-responsive valve. The pressure-responsive valve, in turn, responds to the pressure of the compressed gaseous mixture delivered through the solenoid-operated valve to deliver the compressed gaseous mixture to its associated adsorbent bed for passage therethrough. When the solenoid operated valve is closed to block delivery of the compressed gaseous mixture to the pressure-responsive valve, a bleed orifice or other device reduces the gas pressure between the solenoid-operated valve and the pressure-responsive valve, causing the latter valve to open an exhaust passage for venting gases from the adsorbent bed. A cycle control circuit alternately opens the solenoid-operated valves for the two adsorbent beds in the fractionating system, thus alternating the delivery of the compressed gaseous mixture to the two adsorbent beds.

The solenoid-operated valves which are used for alternating the delivery of the compressed gaseous mixture to the two adsorbent beds will close when the electrical power for operating the valves is interrupted for any reason. Under such condition each pressure-responsive valve will automatically operate to depressurize its associated adsorbent bed. Thus, both adsorbent beds will be depressurized upon shutdown to avoid overloading of the compressor upon subsequent start-up and to enhance the subsequent start-up by enabling the oxygen or other key component in the product effluent to reach maximum concentration shortly after power is restored to re-start the system.

The special valve arrangement described above also provides for the quick exhaust of gases from the adsorbent beds and prevents reverse flow through the solenoid-operated valves.

Another important object of this invention resides in the provision of a novel pressure-responsive control system which is of simplified construction for controlling the cyclic operation of the dual adsorbent bed system.

According to yet another feature of this invention, the fractionating apparatus may advantageously be equipped with a novel alarm system which is effective to produce alarms for the following conditions: power failure or power loss, and the failure of the system to automatically switch delivery of the compressed gaseous mixture from one adsorbent bed to the other within a pre-selected time period. The alarm system of this invention also tests the operability of the alarm devices at start-up as well as testing a battery power source which is used for driving the alarm devices.

Further objects of this invention will appear as the description proceeds in connection with the below-described drawings and appended claims.

DESCRIPTION OF DRAWINGS

FIG. 1 is a schematic drawing of a heatless fractionating system incorporating the principle of this invention;

FIGS. 2–4 illustrates the three different operating positions for the pressure-responsive shuttle valve shown in FIG. 1;

FIG. 7 is a schematic circuit diagram for the control circuit that is used with the embodiment of FIG. 6.

DETAILED DESCRIPTION

Figure 5:
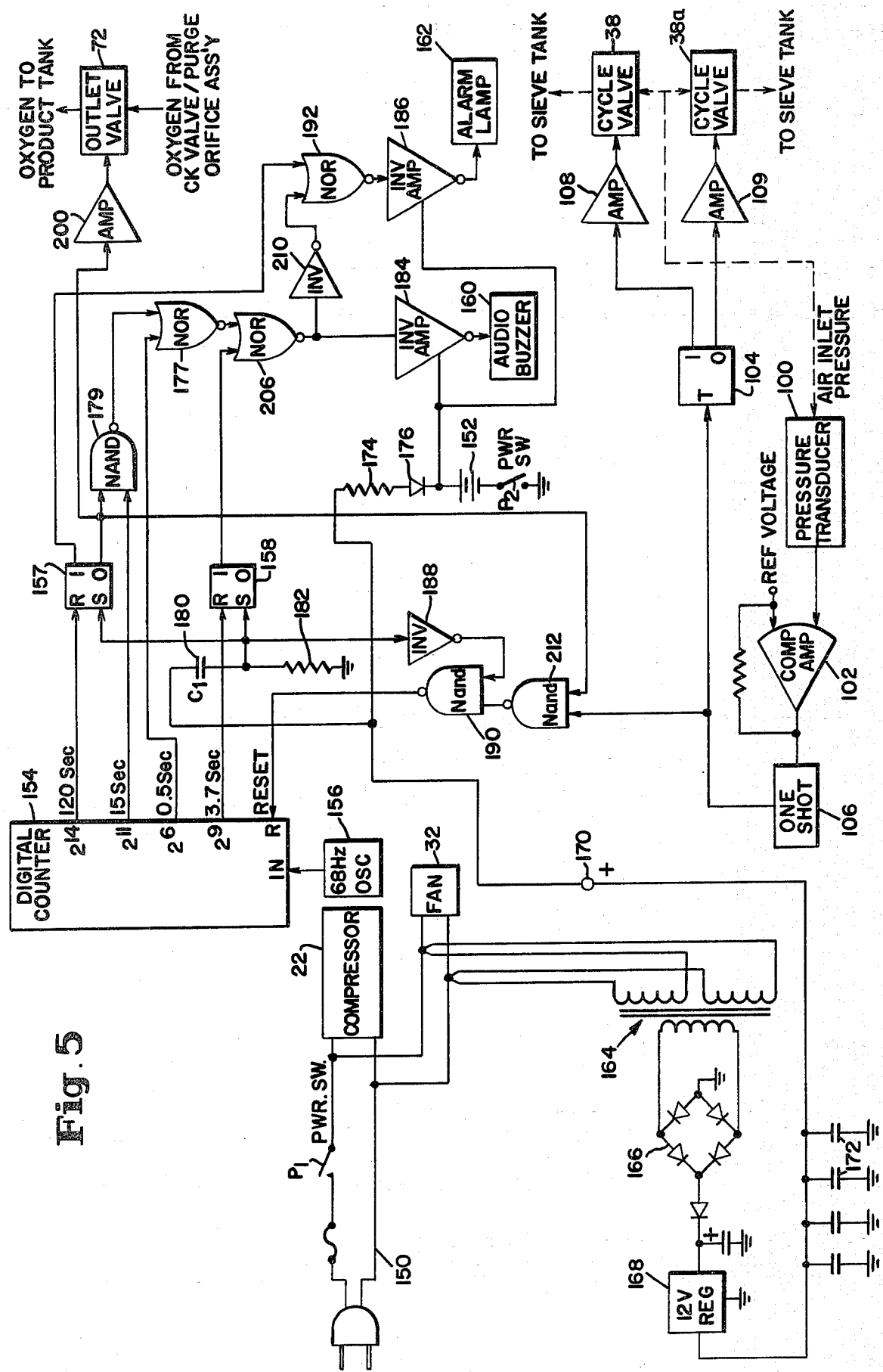
FIG. 5 is a schematic circuit diagram of the control circuit shown in FIG. 1.

Referring to FIG. 1, the heatless fractionating system incorporating the principles of this invention is generally designated at 10 and comprises a pair of fixed adsorbent beds 12 and 14. Beds 12 and 14 are confined in towers or tanks 16, 17 and may be any suitable adsorbent for adsorbing a particular component of a multi-component gaseous mixture.

The fractionating system in the illustrated embodiment is specially designed to supply oxygen enriched air for breathing purposes by individuals. For this application the adsorbent in beds 12 and 14 is selected to adsorb nitrogen from compressed ambient air and may be of the 5 A molecular sieve type. System 10 may be in the form of a compact, portable unit for use in the home or other places. This type of unit is customarily referred to as an oxygen concentrator. It will be appreciated, however, that the principles of this invention are not limited to oxygen concentrators, but instead are applicable to other types of heatless fractionating systems.

As will be described in detail later on, beds 12 and 14 alternately undergo an adsorption phase at elevated pressure and a desorption phase at reduced pressure to provide what is referred to as a pressure swing cycle. The cyclic operation is such that bed 14 will be in its desorption phase while bed 12 is in its adsorption phase and that bed 12 will be in its desorption phase while bed 14 is in its adsorption phase.

Air to be fractionated is delivered through a main inlet line 18 which is common to both beds 12 and 14. An intake air filter 20, a compressor 22, a carbon trap 24 and a heat exchanger 26 are connected seriatim in line 18 in the manner shown. Compressor 22 draws ambient air in through filter 20 and compresses it. The compressed air is pumped by compressor 22 first through carbon trap 24 and then through heat exchanger 26 to branch supply conduits 28 and 30. Conduit 28 connects inlet line 18 to one end of tank 16, and conduit 30 connects inlet line 18 to one end of tank 17.

Compressor 22 may be of the vaned type and may have an intake felt filter (not shown) for removing dust and lint. Filter 20 is used to remove particulate matter from the ambient air. Carbon trap 24 operates as a compressor outlet filter to trap solid particulates coming from the intake of compressor 22 or from the compressor vanes. A motor-driven cooling fan 32 passes air over the heat exchanger 26 to cool the compressed air which is delivered through inlet line 18 to the conduits 28 and 30. A pressure relief valve 33 may be connected to inlet line 18 between the outlet of compressor 22 and carbon trap 24.

According to one aspect of this invention, a unique valve and orifice system is used with each bed 12, 14 for controlling both the flow of incoming compressed ambient air to and the exhaust of purge gas from the bed. The flow control system for bed 12 is generally indicated at 34, and the flow control system for bed 14 is generally indicated at 36.

As shown in FIG. 1, the flow control system 34 comprises a single solenoid-operated valve 38, a three-port pressure-responsive valve 40 and a dump or bleed orifice 42. Valves 38 and 40 are connected in series in conduit 28.

Valve 38 is of the two-way, two-port type having one port (used as the inlet) in fluid communication with the common inlet line 18 and the other port (used as the outlet) in fluid communication with an inlet port 44 of valve 40. Valve 40 also has an operating port 45 and an exhaust port 46. The operating port 45 is connected to tank 16. The exhaust port 46 is connected to atmosphere through a spring-loaded check valve 48 and a muffler 50. Bleed orifice 42 is connected to conduit 28 between the outlet port of valve 38 and the inlet port 44 of valve 40 to provide a bleed or vent to atmosphere. Valve 38 is used to control the delivery of incoming compressed air through conduit 28 to bed 12.

Valve 40 is advantageously of the quick exhaust type and is shown in FIGS. 2-4 to be of a conventional shuttle construction having a shuttle or seal disc 52. Seal disc 52 is shiftable by fluid pressure differential between two operating positions, one being shown in FIG. 2 and the other being shown in FIG. 3.

In the operating position illustrated in FIG. 2 seal disc 52 shuts off or blocks exhaust port 46 and is capable of establishing fluid communication between ports 44 and 45. In the position shown in FIG. 3 seal disc 52 shuts off inlet port 44 and establishes fluid communication between ports 45 and 46.

As shown in FIG. 2, seal disc 52 is provided with a flexible peripheral edge or lip 53 which is flexed downwardly away from the interior fluid-conveying passage wall by the fluid pressure at inlet port 44 when the fluid pressure at inlet 44 exceeds the fluid pressure at the operating port 45. The downward flexing of the peripheral lip 53 establishes the fluid communication between ports 44 and 45. When the fluid pressure at ports 44 and 45 is zero or otherwise equal, the seal disc's flexible peripheral lip 53 will be in its unflexed position (see FIG. 4) where it engages the interior fluid conveying passage wall to block fluid communication between ports 44 and 45. The central portion of seal disc 52 at the same time seats over exhaust port 46, blocking flow of fluid through port 46. This particular type of quick exhaust shuttle valve is manufactured by the Humphrey division of the General Gas Light Company.

When valve 38 is opened during operation of the fractionating system, the pressure of the incoming compressed air in conduit 28 will exceed the fluid pressure in bed 12, causing seal disc 52 to assume the position and condition shown in FIG. 2 for delivering the incoming compressed air to bed 12 while blocking flow of the compressed air through exhaust port 46. This operation of valve 40 in response to the opening of valve 38 initiates the adsorption phase of bed 12.

When valve 38 is closed, the compressed air between valves 38 and 40 will rapidly bleed to atmosphere through orifice 42 (which may have a diameter of about 0.020 inches), thus reducing the pressure at the shuttle valve inlet port 44 to enable the now higher pressure in bed 12 to rapidly shift seal disc 52 to its alternate position (shown in FIG. 3) where it blocks reverse flow of gas through inlet port 44 and establishes fluid communication between ports 45 and 46 to vent purge gas to atmosphere during the desorption phase of bed 12.

From the foregoing description it will be appreciated that the opening of valve 38 during operation of the fractionating system causes seal disc 52 to shift to its normal inlet flow position shown in FIG. 2 for establishing fluid communication between valve 38 and bed 12 and thereby providing for the delivery of incoming compressed air to bed 12, while at the same time blocking flow of the incoming compressed air through exhaust port 46. The closure of valve 38 together with the bleeding of air by orifice 42 enables seal disc 52 to be rapidly shifted to its exhaust position of FIG. 3 for venting reverse-flow purge gas to atmosphere.

Check valve 48, which is connected in series with muffler 50, is optional and is used to minimize the adsorption of ambient moisture when the fractionating system is de-energized. This enhances start-up characteristics.

As shown in FIG. 1, the valve and orifice flow control system 36 for bed 14 is connected to line 30 and is the same as system 34. Accordingly, like reference numerals have been used to designate corresponding components except that the components of system 36 have been suffixed by the letter "a" to distinguish them from the components in system 34. The advantages of systems 34 and 36 will be discussed later on.

Still referring to FIG. 1, the upper ends of tanks 16 and 17 are connected to product effluent line or conduit 60 by branch conduits 62 and 64, respectively. Line 60 is common to beds 12 and 14 and is connected to deliver the primary product effluent (oxygen enriched air to this embodiment) to a product storage tank 66. A check valve 67 in conduit 64 blocks reverse flow of oxygen enriched air from line 60 to bed 14. Similarly, a check valve 68 in conduit 62 blocks reverse flow of oxygen enriched air from conduit 60 to bed 12.

Check valves 67 and 68 are bypassed by a purge orifice 70. During the adsorption phase of bed 14, orifice 70 delivers oxygen enriched air from bed 14 to bed 12 for reverse flow through bed 12. This purging action desorbs and thus regenerates bed 12. During the adsorption phase of bed 12, orifice 70 delivers oxygen enriched air from bed 12 to bed 14 for reverse flow through bed 14 to purge or desorb bed 14.

An on-off valve 72 is connected in the product effluent line 60 and controls the delivery of oxygen enriched air to the product tank 66. In the illustrated embodiment, valve 72 is of the solenoid operated type.

The outlet of the oxygen product tank 66 is connected through an outlet line or conduit 76 to the user. A pressure regulator 78, an outlet bacteria filter 82, a flow control valve 84 and a flow meter 86 are all connected in series in line 76. Oxygen enriched air from tank 66 is delivered first through regulator 78. From there the oxygen enriched air is delivered through filter 82, then through flow control valve 84 and finally flow meter 86 to the user. Filter 82 is used to ensure product purity for breathing. The flow control valve 84 and flow meter 86 are used to set and hold constant a desired outlet oxygen flow rate.

According to another feature of this invention, all of the available unadsorbed oxygen enriched gas is used to purge the desorbing bed for a short time period at start-up. This operation advantageously reduces the time required to reach maximum oxygen concentration and is accomplished by keeping the on-off valve 72 closed during the initial start-up period. The operation of valve 72 is automatically controlled by a control circuit 90 (FIGS. 1 and 5).

According to a further feature of this invention, a novel, simplified pressure-responsive control system is used to control the cyclic operation of valves 38 and 38a. Beds 12 and 14 are thus pressure cycled between their adsorption and desorption phases rather than being time cycled as by timers or other similar devices. The pressure responsive control system which provides for the pressure-responsive cyclic operation of valves 38 and 38a, forms a part of control circuit 90 and is shown in FIG. 5 to mainly comprise a single pressure transducer 100, a comparator 102, and a flip-flop 104.

Transducer 100 is of the type that produces an electrical signal voltage having a magnitude or amplitude proportional to a sensed fluid pressure. The magnitude of the transducer's electrical output signal will therefore vary with the sensed pressure.

Pressure transducer 100 is connected into the fractionating system at a single location where it can sense the gas pressure for each of the beds 12, 14 during the bed's adsorption phase. In the illustrated embodiment, this is accomplished by connecting the pressure-sensing input of transducer 100 to sense the gas pressure at the place where the incoming, compressed ambient air is delivered from inlet line 18 to supply conduits 28 and 30 between valves 38 and 38a. This pressure sensing connection is downstream from heat exchanger 26 at or near the juncture of inlet line 18 with supply conduits 28 and 30. At this location, transducer 100 will sense the gas pressure in bed 12 but not bed 14 when bed 12 is in its adsorption phase because valves 38 and 40 will be open and valve 38a will be closed. At this location transducer 100 will also sense the gas pressure in bed 14 when bed 14 is in its adsorption phase, and not bed 12, because valves 38a and 40a will then be open, and valve 38 will then be closed. The fluid pressure input of transducer 100 may alternatively be connected to sense the pressure of the pressurized product effluent (the oxygen enriched air) entering line 60 from outlet conduits 62 and 64.

The electrical signal output of transducer 100 is applied to one input of the comparator amplifier 102. The other input of the comparator amplifier 102 connects to a source of fixed reference voltage corresponding to the trip fluid pressure at which switchover from one bed to the other is desired. The output of comparator amplifier 102 is applied to a one shot multivibrator 106 for triggering the one shot multivibrator. The output of multivibrator 106 is applied to the clock or T input of flip-flop 104. Flip-flop 104 changes or switches states in response to a pulse at its T input and remains in the state to which it has switched until the next pulse input. The 1 output of flip-flop 104 is applied through an amplifier 108 to the solenoid operator of cycle valve 38. The 0 output of flip-flop 104 is applied through another amplifier 109 to the solenoid operator of cycle valve 38a. Each of the valves 38, 38a is of the normally closed type. These valves are therefore opened by energizing their solenoid operators.

The reference voltage input for comparator 102 is set at a value that is low enough to ensure that switchover from one adsorbing bed to the other occurs before the adsorbing bed completely saturates with adsorbed gases. For the illustrated embodiment the reference voltage is set to a value corresponding to approximately 15 psig. When the pressure of the compressed air leaving inlet line 18 rises to or above 15 psig, the electrical signal output of transducer 100 therefore rise to or above the fixed reference voltage input for comparator 102. When this happens, the output voltage of comparator 102 rises from zero to some predetermined value to trigger the one-shot multivibrator 106. The pulse supplied by triggering the one-shot multivibrator 106 will switch flip-flop 104, causing it to change states.

In the 1 state, the 1 output of flip-flop 104 will be high at some predetermined voltage while the 0 output of the flip-flop will be at zero volts. In this state the solenoid operator for valve 38 will be energized to open valve 38, and the solenoid operator of valve 38a will be de-energized, thus leaving valve 38a closed. When flip-flop 104 is switched to its other state (where the 1 output is at zero volts and the 0 output is high at some predetermined voltage) valve 38a will be opened and valve 38 will be closed.

Prior to start-up, compressor 22 and fan 32 are turned off and the solenoid operators for valve 38, 38a and 72 are de-energized. Valve 38, 38a and 72 will therefore be closed. Before start-up, both beds 12, 14 will normally be de-pressurized such that, at best, the pressure in tanks 16, 17 will be only slightly above atmospheric pressure. Valves 40 and 40a will therefore normally be in the position shown in FIG. 3 (for a slight pressure in tanks 16, 17) or in the position shown in FIG. 4 (for zero psig in tanks 16, 17).

Operation of the fractionating system 10 thus far described is initiated by applying power to control circuit 90 and by starting up compressor 22 and fan 18. Application of power to control circuit 90 results in the application of power to flip-flop 104. When this happens, flip-flop 104 will arbitrarily assume one of its two states. If it assumes its 1 state (where the voltage at its 1 output is high at some predetermined value and the voltage at its 0 output is zero), valve 38 will open, and valve 38a will remain closed. Valve 72 will also remain closed for a short initial period at start-up.

Incoming compressed ambient air is delivered by compressor 22 to supply conduits 28 and 30. Being closed, valve 38a blocks flow of the compressed air to bed 14. Valve 38, on the other hand, is open at this time, thus delivering the incoming compressed ambient air to valve 40. The pressure of the compressed ambient air an inlet port 44 shifts seal disc 52 to its inlet flow position shown in FIG. 2 where it blocks the exhaust and provides for the delivery of the incoming compressed air to bed 12. The compressed air flows through bed 12, thus pressurizing the bed and initiating the bed's adsorption phase.

The nitrogen molecules in the compressed air will be adsorbed by the adsorbent molecular sieve in bed 12 as the compressed air passes through the bed. The concentration of oxygen in the compressed unadsorbed gas leaving bed 12 will therefore be increased.

The unadsorbed gas exiting from bed 12 will flow through check valve 68 but will not be delivered to tank 66 at this initial start-up time because valve 72 is still closed. Thus, all of the unadsorbed gas flowing through the outlet conduit 62 will be delivered through purge orifice 70 and outlet conduit 64 to the top of tank 17. The unadsorbed gas entering the bed 14 from conduit 64 will be at a reduced pressure because of the pressure drop across orifice 70. The pressure of the unadsorbed gas in conduit 64 is low enough so that it will not unseat check valve 67.

The reverse flow of the unadsorbed gas through bed 14 purges or desorbs bed 14 by carrying away previously adsorbed nitrogen or water vapor in the bed. This purging action activates or regenerates the bed, increasing its nitrogen adsorbtive capacity. Thus, the adsorption phase of bed 12 and the desorption phase of bed 14 take place at the same time.

The pressure of the purge gas entering bed 14 is sufficient to cause the seal disc in shuttle valve 40a to assume the position shown in FIG. 3 for placing valve 40a in its exhaust mode. As a result, the purge gas will be exhausted to atmosphere through check valve 40a and muffler 50a. In its exhaust mode, valve 40a also blocks reverse flow of the purge gas through port 44a.

As incoming compressed air flows through bed 12 during the bed's adsorption phase the fluid pressure in bed 12 rises because the air flow into the bed is much higher than the flow of unadsorbed gas (product effluent) leaving the bed. This condition will occur even when valve 72 is open. The rising bed pressure is sensed by transducer 100, and when it increases to the value corresponding to the fixed reference voltage input to comparator 102, the output of comparator 102 rises to a pre-determined value for triggering multivibrator 106. For the illustrated embodiment the rise in fluid pressure in the adsorbing bed will reach the switchover or trip pressure level of about 15 psig in about 13 to 15 seconds. The one-shot pulse generated by triggering multivibrator 106 causes flip-flop 104 to switch states, thereby simultaneously closing valve 38 and opening valve 38a. Closing of valve 38 blocks delivery of incoming compressed ambient air to bed 12, and opening of valve 38a provides for the delivery of the incoming compressed air to bed 14 by way of valve 40a. The flow of gases through beds 12, 14 therefore reverse direction, initiating the adsorption phase of bed 14 and the desorption phase of bed 12.

Upon closing valve 38, the fluid pressure in the conduit portion between valves 38 and 40 will rapidly drop because of the bleed of the compressed air to atmosphere through dump orifice 42. The fluid pressure at port 44 will therefore quickly drop to a level below the pressure in bed 12, causing operation of valve 40 to its exhaust mode shown in FIG. 3 where bed 12 is now in communication with atmosphere through valve 40, check valve 48 and muffler 50.

When valve 38a is opened, valve 40a will be driven to its inlet flow position as shown in FIG. 2 because the higher fluid pressure at port 44a. The compressed ambient air will therefore flow through bed 14 resulting in the adsorption of nitrogen molecules by the adsorbent sieve in tank 17. The concentration of oxygen in the pressurized unadsorbed gas leaving bed 14 will therefore increase.

The unadsorbed gas exiting from bed 14 will flow through check valve 67 but will not be delivered to tank 66 because valve 72 is still closed at this time. All of the unadsorbed gas flowing through conduit 64 will therefore be delivered through purge orifice 70 and outlet conduit 62 to tank 16 for reverse flow through bed 14. The unadsorbed gas entering tank 16 will be at a reduced pressure because of the pressure drop across orifice 70. The pressure of the unadsorbed gas in conduit 62 is low enough so that it will not open check valve 68.

The reverse flow of unadsorbed gas through bed 12 purges or desorbs bed 12 by carrying away previously adsorbed nitrogen and water vapor in the bed. The purge gas leaving bed 12 is exhausted or vented to atmosphere through valve 40 (which is now in its exhaust mode of FIG. 3), check valve 48 and muffler 50.

During the desorption phase of bed 14, the fluid pressure in tank 17 will be at or near atmospheric pressure because the tank is continuously vented to atmosphere during the desorption phase. Thus, at the moment of switchover from the adsorption phase of bed 12 to the adsorption phase of bed 14, the pressure sensed by transducer 100 upon the opening of valve 38 and the closing of valve 38a will be the atmospheric pressure in tank 17. The signal output of transducer 100 will therefore drop to zero and will therefore be less than the fixed reference voltage input corresponding to 15 psig. The output of comparator 102 will consequently revert to zero.

As the incoming compressed air flows through bed 14 during the bed's adsorption phase, the fluid pressure in bed 14 will rise because, as previously mentioned, the air flow into tank 17 is higher than the flow of unadsorbed gas leaving the tank. When the pressure in tank 17 increases to the 15 psig trip level, the output of comparator 102 again steps up to its predetermined value to again trigger multivibrator 106. As a result, multivibrator 106 will apply another pulse to flip-flop 104 causing the flip-flop to switch back to its original state where it closes valves 38a and opens valve 38. This action completes one cycle of adsorption and desorption for both beds.

Upon opening valve 38 and closing valve 38a the flow of gas through beds 12, 14 will again reverse direction, thus initiating the second adsorption phase of bed 12 and the second desorption phase of bed 14. Upon closing valve 38a, the fluid in the conduit portion between valve 38a and 40a will rapidly decrease to atmosphere because of the bleed of air to atmosphere through dump orifice 42a. As a result, valve 40a will be operated to its exhaust mode (as shown in FIG. 3) where bed 14 is again in fluid communication with atmosphere through valve 40a, check valve 48a and muffler 50a. Thus, the complete cycle of adsorption and desorption of both beds referred to above is continuously repeated. Furthermore, this cycle of adsorption and desorption may be repeated a preselected number of times before valve 72 is opened to ensure that the oxygen concentration in the effluent product quickly reaches a maximum or a relatively high level.

By keeping valve 72 temporarily closed at start-up, maximum concentration of oxygen in the effluent is reached in a very short time period, amounting to approximately two minutes or less where the adsorption phase of each bed is approximately 15 seconds or less, thus adding up to a total time of about 30 seconds or less for the complete cycle of adsorption and desorption. In this manner, the first gas delivered to the oxygen product tank 66 upon opening valve 72 will have an exceptionally high oxygen purity. According to the illustrated embodiment of the invention, the product effluent will have an oxygen purity of more than 90% (free of adsorbed constituents) at the end of the two minute start-up cycle in which valve 72 is kept closed. Furthermore, the product effluent at the termination of the two minute start-up cycle will contain less than 5% of adsorbable gas. It is understood that start-up cycles of less than two minutes may be utilized, but with reduced performance. The circuitry for keeping valve 72 closed for the two minute start-up period will be described in greater detail shortly.

By utilizing all of the oxygen enriched, unadsorbed gas for purging for a short time period at start-up, the time required for the beds to reach maximum performance (i.e., to provide maximum oxygen concentration or purity) is greatly reduced as compared with the usual operation in which a portion of the unadsorbed gas is immediately made available to the user to thus reduce the amount of unadsorbed gas used for purging. In the latter case, it would take approximately ten to twenty minutes of cyclic operation to reach the same oxygen concentration attained at the end of the two-minute regenerative start-up period in which valve 72 is kept closed.

At the end of the two minutes start-up period, control circuit 90 operates to open valve 72, thus providing for the delivery of the oxygen enriched gas to the oxygen product tank 66. Product tank 66 has a sufficient volume to smooth or filter the sieve bed fluid pressure fluctuations to thus provide for an average oxygen enriched gas pressure near 10 psig. Tank 66 will pressurize because flow of the effluent product into the tank is higher than the outgoing effluent flow and further because the effluent product entering tank 66 is prevented from flowing back into tanks 16, 17 by check valves 67 and 68.

Following the opening of valve 72, the cyclic operation described above will continue. The adsorption of gas will therefore alternate between beds 12 and 14, with bed 12 being in its adsorption phase while bed 14 is in its desorption phase and with bed 14 being in its adsorption phase while bed 12 is in its desorption phase. Because of this cyclic operation, the flow of oxygen enriched air to product tank 66 will therefore be continuous. Following opening of valve 72 it will be appreciated that only a portion of the unadsorbed gas is bypassed through orifice 70 for purging the beds during their desorption phases. The remainder of oxygen enriched air is delivered through valve 72 to tank 66.

When power is lost or selectively removed to shut down the system, it will be appreciated that valves 38 and 38a will automatically close with the result that valves 40 and 40a will be placed in their exhaust modes to vent gases in tanks 16 and 17 to atmosphere and to thereby depressurize the adsorbents in tanks 16 and 17.

The flow control systems 34, 36 have several advantages. First, each system requires only one solenoid operated valve (38, 38a) together with a single pressure-responsive valve (40, 40a) for controlling both the delivery of compressed ambient air to the adsorbent bed and the exhaust of purge gas from the adsorbent bed. Second, the use of the large-orifice, pressure-responsive shuttle valves (40, 40a) and the bleed orifices (42, 42a) eliminates the requirement that the solenoid operated flow control valves be of the large, expensive non-air pilot actuated type having large orifice sizes. Instead, the solenoid operated valves (38, 38a) used in this invention may be of the low cost two-way pilot or direct lift operated solenoid type which are used to drive the large orifice area shuttle valves (40, 40a). Third, the coaction of the solenoid operated valve (38, 38a), the pressure-responsive valve (40, 40a) and the orifice bleed to atmosphere (42, 42a) affords a quick exhaust of purge gas from the adsorbent bed upon switchover from the adsorption phase to the desorption phase. Fourth, the possibility of reverse flow of purge gas through the solenoid operated valve (38, 38a) is avoided because the pressure-responsive valve (40, 40a) automatically shifts to its exhaust mode when its associated solenoid operated valve (38, 38a) is closed. Fifth, both of the tanks 16 and 17 will be depressurized when power is either lost or selectively removed to shut down the system to prevent pressurized gas from being trapped in the adsorbent beds upon shut-down and consequent overloading of compressor 22 upon subsequent start-up. This feature enhances subsequent start-up and protects compressor 22 from overload. Sixth, the reduced amount of plumbing (tees, pipe, elbows, etc.) required in this invention, together with the large sized flow orifices used in valves 40, 40a permit a significant reduction in the amount of adsorbent required for achieving high purity oxygen.

Check valves 66 and 68 and orifice 70 may, if desired, be incorporated into a common housing (schematically indicated at 120 in FIG. 1), and valves 66 and 68 may be duckbill check valves of the type shown in FIG. 1 of U.S. Pat. No. 3,155,110. The adsorbent sieve bed material may be the 5AMG alumina silica medical grade as marketed by the Linde division of Union Carbide.

Referring to FIG. 5, the motors for compressor 22 and fan 32 may be connected by a power cord 150 to a suitable a.c. power supply source such as the usual household power supply. A d.c. power supply, preferably a rechargeable battery 152, supplies d.c. power just for the alarms (160, 162) in circuit 90.

In addition to the components already described, circuit 90 includes a digital counter 154, an oscillator 156 for driving counter 154, a pair of flip flops 157 and 158, an audible alarm 160 (e.g. a buzzer), a visual alarm 162 (e.g. a lamp), and an array of logic gates and inverters to be described later on. Closure of a power switch P1, P2 applies a.c. power to the motors for compressor 22 and fan 32 and additionally applies battery power to inverter amplifiers 184, 186 which are used to drive alarms 160 and 162, respectively.

Battery 152 may advantageously be charged during operation of the system. This is accomplished by energizing the transformer 164 through the P1 portion of the power switch. Transformer 164 applies a stepped-down voltage to a rectifier 166. The rectified power from rectifier 166 is applied to a suitable voltage regulator 168 (e.g. 12 volts) for applying a regulated d.c. voltage across a d.c. power supply terminal 170 and ground. Filtering capacitors 172 may be connected across the d.c. power terminals for smoothing the d.c. voltage. The d.c. power at terminal 170 is used to operate the logic in circuit 90 except for amplifiers 184, 186 and, consequently alarms 160, 162.

As shown in FIG. 5, a resistor 174, a diode 176, battery 152, the P2 portion of the power switch are connected in series between the d.c. supply terminal 170 and ground. Closure of the power switch therefore results in the conduction of charging current through battery 152.

In addition to controlling operation of valves 38, 38a and 72, circuit 90 performs several special alarm functions. Through operation of alarms 160, 162 it provides a power loss alarm, a fail-to-cycle alarm, and a cycle time alarm, the last mentioned alarm being indicative, among other things, of a clogged filter condition to alert the user to the need for cleaning or replacing the carbon trap and/or inlet filters. Through operation of alarms 160 and 162 it also provides a battery check by indicating whether d.c. operating power has been applied following closure of power switch P1, P2.

Advantageously, "negative" logic is used in circuit 90 to drive the alarms 160, 162 which are powered solely by battery 152. Thus, with power switch P1, P2 closed, alarms 160, 162 will be driven to give an alarm when no signal is applied to the amplifier input of either or both of the alarms. Opening power switch P1, P2 removes battery power, as is evident from FIG. 5, thus shutting off the alarms. With power applied during normal operation after a start-up period, the alarms 160, 162 are kept disabled.

In the illustrated embodiment, the $2^6$, the $2^9$, the $2^{11}$, and the $2^{14}$ outputs of counter 154 are utilized, and the operating frequency for oscillator 156 is selected at 68 Hz. It will be appreciated, however, that other oscillator operating frequencies may be utilized together with other counter outputs depending upon desired operating conditions. For the 68 Hz oscillator operating frequency it will be appreciated that the counter's $2^6$ output will go high at 0.5 seconds after reset, that the counter's $2^9$ output will go high at 3.7 seconds after reset, that the counter's $2^{11}$ output will go high 15 seconds after reset, and that the counter's $2^{14}$ output will go high at 120 seconds after reset.

The counter's $2^9$ output is connected to the reset input of flip flop 158, and the counter's $2^{14}$ output is connected to the reset input of flip flop 157. The counter's $2^6$ output is connected to one input of a NOR gate 177, and the counter's $2^{11}$ output is connected to one input of a NAND gate 179.

Upon closure of the power switch P1, P2, flip flop 157 and 158 will be set by an RC circuit comprising a capacitor 180 and a resistor 182 connected in series across the d.c. power supply terminal 170 and ground. The junction between capacitor 180 and resistor 182 is connected to the set inputs or terminals of flip flops 157 and 158 as shown.

Closure of the power switch P1, P2 applies battery power to the alarm-driving inverters 184, 186 and also applies a.c. power to start operation of compressor 22 and fan 32. The applied d.c. power from regulator 168 begins charging battery 152 through resistor 174 and diode 176, as well as generating a positive going signal, or a high, at the junction between capacitor 180 and resistor 182. The positive going signal at this junction performs two operations. First, it sets flip flops 157 and 158. Second, it operates through an inverter amplifier 188 to establish a momentary high at the output of a NAND gate 190. The momentary high at the output of gate 190 resets the digital counter 154, thus initiating the counter's timing intervals. All of the outputs of counter 154 will therefore be reset to the low state upon the initial application of power or following a power interruption.

Upon setting flip flops 157 and 158 it will be appreciated that the 1 output of each flip flop will go high at some suitable voltage and that the 0 output will go low. The high at the 1 output of flip flop 157 causes the output of a NOR gate 192 (which has one input connected to the 1 output of flip flop 157) to go low. This in turn causes the output of the inverting amplifier 186 (which has its input connected to the output of gate 192) to go high, turning on the alarm lamp 162. The 0 output of flip flop 157 is connected through an amplifier 200 to the solenoid operator for valve 72. Thus when flip flop 157 is set, the low or zero voltage at the 0 output of flip flop 157 will keep the outlet valve 72 closed.

Upon setting flip flop 157 and resetting counter 154 at start-up, the inputs to NAND gate 179 (which are connected to the 0 output of flip flop 157 and to the $2^{11}$ output of counter 154) will be low, allowing the output of gate 179 to go high. The high at the output of gate 179 causes the output of NOR gate 177 (which has one of its inputs connected to the output of gate 179) to go low. The output of NOR gate 177 is applied to one input of a further NOR gate 206, and the other input of NOR gate 206 is connected to the 1 output of flip flop 158. Despite the low at the output of NOR gate 177, the output of NOR gate 206 is prevented from going high at this initial stage of the operation because of the high developed at the 1 output of flip flop 158. The output of NOR gate 206, therefore, will initially be low. The inverting amplifier 184 (which is connected to the output of NOR gate 206) inverts the low at the output of gate 206 to turn on the audible alarm 160. An inverter 210 is connected between the output of gate 206 and an input of gate 192. This input to gate 192 therefore goes high when the output of gate 206 is low to reinforce the low condition of gate 192 at start-up.

From the foregoing description it will be appreciated that closure of the power switch P1, P2 sets flip flop 157 and 158 and reset counter 154. Resetting the counter and setting the flip flops at start-up normally results in the energization of alarms 160 and 162. Thus, alarms 160 and 162 will normally turn on immediately after the power switch is closed.

Upon closure of the power switch P1, P2, flip flop 104 also powers up in a random condition as previously described to open one of the two cycle valves 38, 38a. Gas pressure therefore begins to rise in the adsorbent-containing tank (16, 17) which is connected to the opened cycle valve. At this stage, the output of the comparator amplifier 102 and the output of the one shot multivibrator 106 will be low. The low from multivibrator 106 and from flip flop 157 allows the output of a further NAND gate 212 (which has its inputs connected to multivibrator 106 and the 0 output of flip flop 157) to go high. The high at the output of gate 212 together with the high at the output of the inverting amplifier 188 causes the output of gate 190 to go low, thus completing the counter reset pulse which is supplied by gate 192.

It will be appreciated that the foregoing conditions occur any time that there is a power interruption or when power is first applied to the circuit 90.

From the foregoing description it will be appreciated that if the system is functioning properly both alarms 160 and 162 should turn on immediately after the power switch P1, P2 is closed, thus signalling to the user that the alarms are functioning and that adequate battery power is being supplied to the amplifiers 184 and 186 for driving the alarms. If the alarms are not turned on upon closing the power switch P1, P2, the user is signaled that one of two malfunctions exist. The first is that the battery 152 is not supplying any d.c. power or is supplying inadequate d.c. power for powering up the alarm-driving amplifiers 184 and 186. The second is that both alarms are malfunctioning. Thus, the logic in circuit 90 provides a battery and alarm test at start-up to indicate whether the alarms are operating satisfactorily and also whether the battery 152 is applying adequate operating power for the alarm-driving amplifiers.

Shortly after start-up, the $2^6$ output of counter 154 begins to generate a pulse (a momentary high) every 0.5 seconds. These pulses are fed to the input of NOR gate 177, but have no effect because the output of gate 177 is held low by the high from NAND gate 179. At approximately 4 seconds after reset of counter 154, the counter's $2^9$ output goes high to reset flip flop 158. When this happens, the 1 output of flip flop 158 goes low, allowing the output of NOR gate 206 to go high. The high generated at the output of gate 206 causes the output of inverter amplifier 184 to go low, thereby turning off alarm 160 and enabling NOR gate 192. The audible alarm therefore ceases, signaling the end of the battery and alarm test period. The visual alarm 162, however, remains on, and at this time the pressure in the adsorbing bed (12, 14) is still rising towards but has not reached the 15 psig switchover level.

If conditions are normal, the pressure in the adsorbing bed will reach the 15 psig switchover level in approximately 13 seconds. When this happens, the output of the comparator 102, as previously described, goes high to trigger the multivibrator 106. As a result, flip flop 104 changes states to switch power from one cycle valve solenoid to the other, thereby closing the open one of the two cycle valves 38, 38a and opening the closed one of the two cycle valves. Assuming that cycle valve 38 was initially opened, it will close, and cycle valve 38a will open. The gas pressure in bed 12 therefore drops abruptly and the gas pressure in bed 14 begins to rise slowly. As a result, the output of comparator goes low again. The system is so designed that under normal operating conditions, the switchover from one cycle valve to the other and hence from one bed to the other occurs in a time period that is less than 15 seconds.

The momentary high produced at the output of multivibrator 106 as a result of triggering the multivibrator is also applied to NAND gate 212. The output of gate 212, however, will not change and will remain high at this time because of the low at the 0 output of flip flop 157. Up to this point in the time cycle, it will be appreciated that the $2^6$ and the $2^9$ outputs of counter 154 will be producing high pulses every 0.5 seconds and 3.7 seconds, respectively. No changes in state, however, will occur because of the disable commands previously described.

At the expiration of 15 seconds after reset, the $2^{11}$ output of counter 154 goes high, but causes no change in state at the output of NAND gate 179 because of the low that is presently being supplied from the 0 output of flip flop 157. All other states will remain the same at this time.

Upon the expiration of 120 seconds following reset, the $2^{14}$ output of counter 154 goes high to reset flip flop 157. The 0 output of flip flop 157 therefore goes high to operate the solenoid operator of valve 72, thus opening valve 72 to supply oxygen enriched gas to the oxygen product tank 66. Upon resetting flip flop 157, the signal state at the flip flop's 1 output switches to a low causing the output of NOR gate 192 to go high. When this happens the output of the inverter amplifier 186 goes low to turn off the alarm lamp 162, thus signaling the end of the two minute regeneration or start-up period in which all of the unadsorbed, oxygen enriched gas is used for regeneration or purging as previously described.

Thus, at 120 seconds into the time cycle the system will be in full, normal operation supplying oxygen enriched gas to the product tank 66.

Upon being reset at the end of the 120 second time interval, flip flop 157 will supply a high to NAND gates 179 and 212, thus enabling gates 179 and 212. At this time, however, the outputs of NAND gates 179 and 212 will remain high because the $2^{11}$ output of counter 154 will be low at 120 seconds after reset.

It will be appreciated from the foregoing that the one shot multivibrator 106 will be triggered to produce an output pulse or a momentary high approximately every 13 seconds during the 120 second (2 minute) start-up period in which outlet valve 72 is held closed. During this two minute interval, however, flip flop 157 remains in its set state so that the low at its 0 output prevents the pulses supplied by multivibrator 106 from resetting counter 154. At the end of the two minute start-up period, however, flip flop 157 is switched to its reset state, thus providing a high at its 0 output. Thus, the very next pulse supplied by multivibrator 106 after the elapse of the 120 second time interval will cause the output of NAND gate 212 to momentarily go low for the duration of the multivibrator pulse. This in turn causes the output of NAND gate 190 to momentarily go high for the duration of the low at the output of NAND gate 212. The momentary high at the output of NAND gate 190 thus resets counter 154. Upon reset all of the outputs of counter 154 go low and all of the previously described counter time intervals will begin again.

If multivibrator 106 fails to produce a high at least once every 15 seconds after the elapse of the 120 second start-up period, then the $2^{11}$ output of counter 154 will go high. When this happens, both inputs of NAND gate 179 will become high causing the output of NAND gate 179 to go low. When the output of NAND gate 179 goes low, the output of NOR gate 177 will pulse high and low under the influence of pulses from the $2^6$ output of counter 154. This causes the output of NOR gate 206, the output of the inverting amplifier 184, and the output of NOR gate 192 to all pulse high and low, thereby producing intermittent or pulsing audible and visual alarms to signal the user that a system has failed to make a cyclic changeover from one adsorbent bed (12, 14) to the other within the 15 second time frame. Due to the pulsing of the counter's $2^{11}$ output (which under this alarm condition will be high for 15 seconds and low for 15 seconds in each cycle), the alarm condition will remain on for 15 seconds, will reset for 15 seconds and will return again until either a pulse is received from multivibrator 106 or until power is removed from the circuit. In the case where the system simply fails to cycle, as distinguished from a delayed switchover from one adsorbent bed to the other, the alarms will come on and will pulse for 15 seconds every 15 seconds as long as power is applied to the circuit. Such a failure to cycle may be attributable to a failed valve, hose, connection, compressor or electronic component. Pulsing the alarm saves battery power.

In the case where the cyclic switchover from one adsorbent bed to the other occurs belatedly after 15 seconds, one or more alarm pulses will be produced until multivibrator 106 finally goes high in response to the belated rise of gas pressure in the adsorbing bed to the 15 psig switchover level. Such a delayed cyclic switchover may be due to a number of different conditions, the chief one being reduced compressor flow (i.e., compressed ambient air flow) due to a clogged compressor inlet filter and/or a clogged compressor outlet filter. If multivibrator 106 produces an output pulse after the 15 second time period as in the case of the delayed cyclic switchover explained above, counter 154 will at that time be reset, turning off the alarms and then recycling through its normal time intervals previously explained.

If a.c. power is lost due to a power failure, or a power cord disconnection, during the time in which the power switch P1, P2 is closed, all of the electronic logic signals will go low except for the two at the output of the alarm-driving inverting amplifiers 184 and 186. Under such a condition the output of the inverter amplifiers 184 and 186 will go high to turn on alarms 160 and 162. It will be noted that as previously described, the inverting amplifiers 184 and 186 are powered directly from battery 152 and therefore remain energized to respond to the outputs of gates 206 and 192 when the external a.c. power source is lost. Since there are no pulsing signals available during the time in which the a.c. power is lost, the power loss alarm provided by alarms 160 and 162 will be steady rather than intermittent. This provides a distinction from the other alarm conditions already described.

Restoration of a.c. power returns the system through the entire start-up process already described, starting with the setting of flip-flops 157 and 158 and the resetting of counter 154.

Summarizing the states of the illustrated outputs of counter 154, all of the counter's outputs will be low upon resetting the counter. At the end of 3.7 seconds after reset, the counter's $2^9$ output goes high, the counter's $2^{11}$ and $2^{14}$ outputs still remain low and the counter's $2^6$ output will be pulsing high and low. At the end of 15 seconds after reset, the counter's $2^{11}$ output goes high, the counter's $2^{14}$ output remains low and the counter's $2^6$ and $2^9$ outputs will be pulsing high and low. At the end of 120 seconds after reset, the counter's $2^{14}$ output goes high, the counter's $2^{11}$ output will be low and the counter's $2^6$ and $2^9$ outputs will be pulsing high and low.

Figure 6:
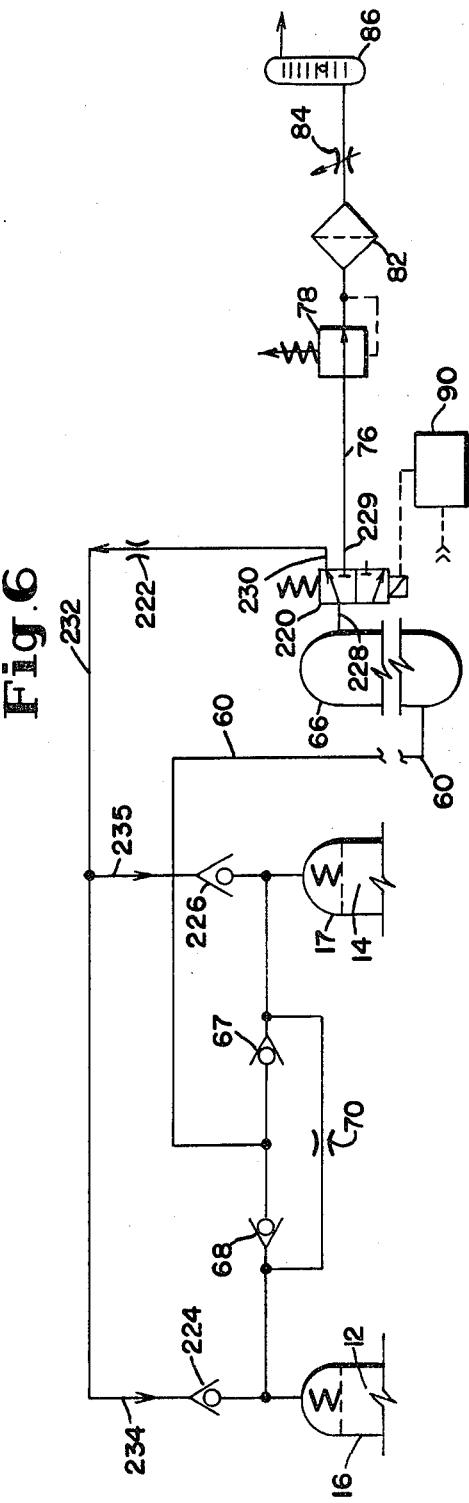
FIG. 6 is a schematic of a heatless fractionating system according to another embodiment of this invention.

In the embodiments shown in FIG. 6, a three way on/off solenoid operated valve 220 is used in place of the on/off valve 72, and a shutdown purge orifice 222 and a pair of check valves 224 and 226 have been added to the fractionating system.

Apart from these exceptions the embodiments of FIGS. 1 and 6 are the same. Accordingly, like reference numerals have been applied to identify corresponding parts in the two embodiments.

As shown in FIG. 6, valve 220 has an inlet port 228 connected to the outlet of product tank 66, a first outlet port 229 connected to the outlet conduit 76, and a second outlet port 230 connected to a return line 232. When the solenoid operator for valve 220 is energized, valve 220 is conditioned to connect the outlet of product tank 66 to the outlet line 76 and to disconnect the return line 232 from the product tank outlet. When the solenoid operator for valve 220 is de-energized, the valve is conditioned to connect the outlet of product tank 66 to return line 232 and to disconnect the product tank from outlet line 76. Orifice 222 is connected in line 232 downstream from valve 220. Line 232 feeds a pair of branch conduits or lines 234 and 235 which respectively connect to the upper ends of tanks 16 and 17. Check valve 224 and 226 are located in branch conduits 234 and 235, respectively, to prevent reverse flow from tanks 16 and 17 to the return conduit 232.

As shown in FIG. 7, the control circuit 90 has been modified in such a way that the solenoid operator for valve 220 will be energized to operate the valve to the position where it connects tank 66 to outlet line 76 immediately upon closure of the power switch P1, P2. This is accomplished by connecting the input of amplifier 200 directly to the d.c. power supply terminal 170, by eliminating flip-flop 157, and by eliminating the use of the $2^{14}$ output of counter 154. Additionally, the two inputs of NAND gate 179 are tied together so that they are both supplied by the $2^{11}$ output of counter 154. Additionally, the inputs of NOR gate 192 are tied together to be fed by inverter 210, and the inputs of NAND gate 212 are also tied together to be fed by multivibrator 106. The control circuit for the embodiment of FIG. 6 is otherwise the same as that shown in FIG. 5.

In operation of the embodiment shown in FIGS. 6 and 7 it will be appreciated that valve 220 will open immediately upon closure of the power switch P1, P2 to enable high concentration oxygen effluent to flow immediately through line 60 and into tank 66, and from there through outlet line 76 to the user. When power is removed as by opening the power switch P1, P2 or when power is lost, valve 220 is shifted to its alternate position where it connects the product tank 66 to the return line 232. As a result, the high concentration oxygen effluent then stored in tank 66 is returned through orifice 222 and check valve 224 and 226 to tanks 16 and 17 for reverse flow through the depressurized adsorbent beds 12 and 14. In doing so, beds 12 and 14 are purged of adsorbed nitrogen and are left immersed in oxygen enriched air ready to be instantaneously delivered to the product tank 66 upon subsequent start-up.

Thus, for the embodiment of FIG. 6, it will be appreciated that instead of making the stored oxygen enriched gas available to the patient or individual upon shutdown, the oxygen enriched gas in tank 66 is allowed to flow back through purged orifice 222 and check valves 224 and 226 for purging or regenerating beds 12 and 14. In doing so, the desired high purity oxygen is attained even more quickly with the embodiment of FIG. 6 than with the embodiment of FIG. 1.

Figure 8:
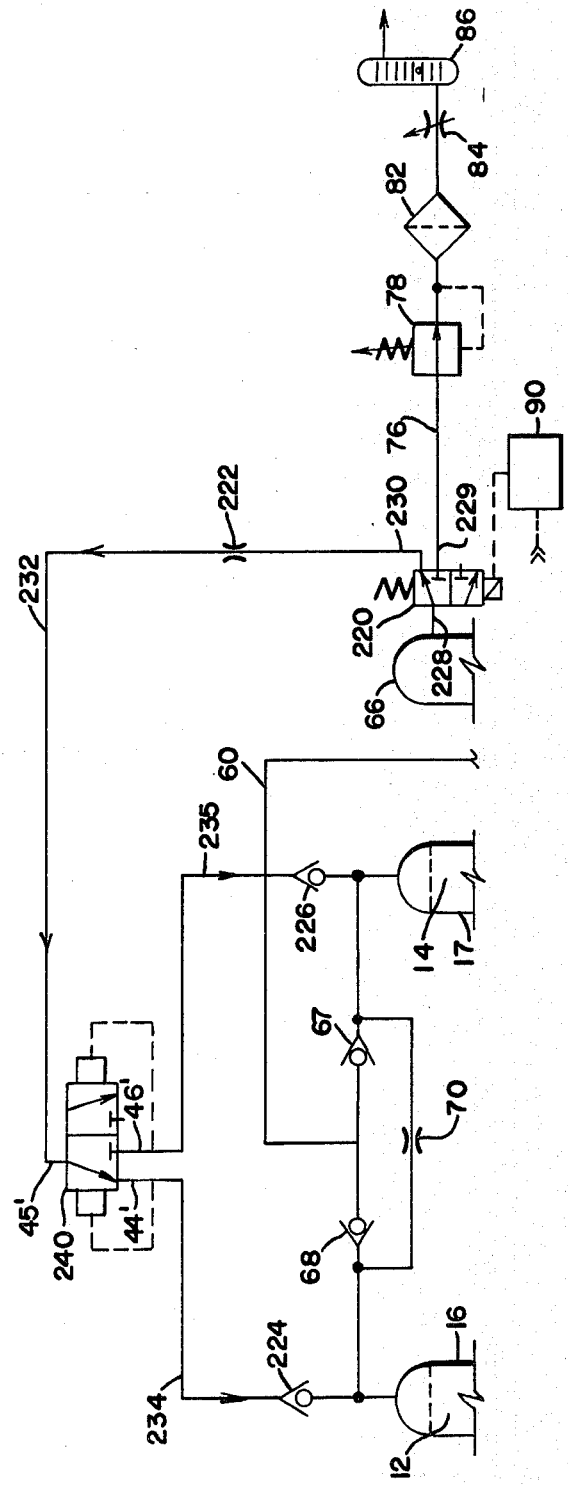
FIG. 8 is a schematic of a heatless fractionating system according to yet another embodiment of this invention.

In the modification shown in FIG. 8 a pressure-responsive shuttle valve 240 is used in place of check valves 224 and 226. The embodiment of FIG. 8 is otherwise the same as that of FIG. 6. Accordingly, to the extent that the embodiments of FIGS. 6 and 8 are alike, like reference numerals have been used to designate like parts.

Shuttle valve 240 is advantageously of the same type shown in FIGS. 2–4. Like reference numerals have therefore been applied to identify like parts except that the reference numerals used for for designating the parts of the shuttle valve in FIG. 8 have been primed to distinguish them from those used in FIGS. 1–4.

As shown in FIG. 8, port 45' is used as an inlet port and is connected to line 232 downstream from orifice 222. Port 44' is used as an outlet port and is connected through branch conduit 234 to tank 16. Port 46' is also used an an outlet port and is connected through branch conduit 235 to tank 17. The shuttle disc (indicated at 52 in FIGS. 2–4) in valve 240 is moved back and forth by the adsorbent bed pressures in such a way to establish fluid communication between the return line 232 and the adsorbent bed which is at the higher pressure and hence in its adsorption phase when the power was removed to shut down operation of the system.

When bed 12 is in its adsorption phase and thus at a higher pressure than bed 14, return line 232 will be in communication with tank 16 so that upon shutdown the high concentration oxygen effluent in tank 66 will be fed to bed 12, but not bed 14. Conversely, when bed 14 is in its adsorption phase and hence at a higher pressure than bed 12, the condition of valve 240 will be such that return line 232 will be in communication with tank 17. Thus, upon shutdown the high concentration oxygen effluent stored in tank 66 will be delivered to bed 14, but not bed 12.

From the foregoing it will be appreciated that in the embodiment of FIG. 8, fluid communication will be established between tank 66 and the bed which was last in its adsorption phase at the time of shutdown. Therefore, all of the stored high concentration oxygen effluent will be used to purge the adsorbent bed that was last in its adsorption phase to thus establish a more efficient use of the oxygen enriched gas on shutdown.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of fractionating a gaseous mixture containing at least first and second components, comprising the steps of passing the gaseous mixture containing said components alternately through first and second bodies of adsorbent to adsorb at least said first component but not said second component such that the unadsorbed gas leaving each of said bodies contains said second components, for a pre-selected time period starting with the initiation of the passage of the gaseous mixture alternately through said bodies, (a) passing all of the unadsorbed gas leaving said first body through said second body during the time in which the gaseous mixture is passing through said first body to purge adsorbed components from said second body and (b) passing all of the unadsorbed gas leaving said second body through said first body during the time in which the gaseous mixture is being passed through said second body to purge adsorbed components from said first body, and after expiration of said pre-selected time period, delivering a fraction of the unadsorbed gas leaving each body to a user and utilizing the remainder of the unadsorbed gas to purge said bodies of the adsorbed components.

2. The heatless method of fractionating apparatus defined in claim 1 wherein said adsorbent is a material for adsorbing at least nitrogen from air, wherein said gaseous mixture is air, and wherein said second component is oxygen.

3. In a heatless fractionating apparatus for fractionating a gaseous mixture having at least first and second components, at least one vessel, first means for pressurizing the gaseous mixture containing said components, a first valve connected intermediate said pressurizing means and said vessel and having fluid flow an inlet port for receiving the pressurized gaseous mixture, second means connected intermediate said pressurizing means and said inlet port for delivering the pressurized gaseous mixture to said inlet port, said first valve having a further fluid flow port in fluid communication with the interior of said vessel, and said first valve being responsive to the pressure of the pressurized gaseous mixture delivered to said inlet port for delivering the pressurized gaseous mixture through said further port to said vessel for flow through said vessel, said vessel containing an adsorbent for adsorbing at least said first component but not said second component of said gaseous mixture as the gaseous mixture flows through said vessel, said second means comprising a second valve responsive to a rise in the pressure of the gaseous mixture undergoing fractionation to a predetermined value for blocking the delivery of the pressurized gaseous mixture to said inlet port, and third means rendering said second valve effective to vent gases from said vessel during the time when delivery of the pressurized gaseous mixture to said inlet port is blocked.

4. The heatless fractionating apparatus defined in claim 3 wherein said third means comprises means providing for a reduction of gas pressure at said inlet port during the time when the delivery of the pressurized gaseous mixture to said inlet port is blocked, and said first valve being further responsive to said reduction of gas pressure at said inlet port for opening an exhaust passage that provides for the venting of gases from said vessel.

5. The heatless fractionating apparatus defined in claim 4 wherein said exhaust passage comprises a third fluid flow port which forms a part of said first valve, wherein said first valve has means responsive to the reduction of the gas pressure at said inlet port to vent gases from said vessel through said third port while blocking flow of the vented gases through said inlet port.

6. The heatless fractionating apparatus defined in claim 5 wherein said second valve is a solenoid operated valve having a solenoid operator, wherein an electrical control circuit is connected to said operator for intermittently energizing said solenoid operator, said second valve being opened by energization of said solenoid operator and closed by de-energization of said solenoid operator such that removal of electrical power from said circuit results in the closure of said second valve, whereby said first valve is effective through operation of said third means to vent gases from said vessel whenever electrical power is removed from said electrical control circuit.

7. The heatless fractionating apparatus defined in any one of the preceding claims 4, 5 or 6 wherein said second valve is in fluid communication with said inlet port through a fluid flow passage for delivering the pressurized gaseous mixture to said inlet port, and wherein said pressure reducing means is connected to said fluid flow passage for bleeding the gases in said flow passage to atmosphere.

8. The heatless fractionating apparatus defined in any one of the preceding claims 4, 5 or 6 wherein said second valve is in fluid communication with said inlet port through a fluid flow passage for delivering the pressurized gaseous mixture to said inlet port, and wherein said pressure reducing means comprises an orifice connected to said fluid flow passage for bleeding the gases in said fluid flow passage to atmosphere.

9. The heatless fractionating apparatus defined in any one of the preceding claims 3, 4, 5 or 6 wherein the pressurized gaseous mixture is directed to flow in a first direction through said adsorbent, said heatless fractionating apparatus further including means for introducing a purge gas into said vessel during intervals in which delivery of the pressurized gaseous mixture to said vessel is stopped, said purge gas being directed to flow through said adsorbent in a direction that is counter current to said first direction, and said purge gas containing at least said second component to effect the desorption of said first component from said adsorbent, said first valve being conditioned to vent said purge gas from said vessel during the intervals in which the delivery of pressurized gaseous mixture to said inlet port is blocked.

10. The heatless fractionating apparatus defined in any one of the preceding claims 3, 4, 5, or 6 wherein said adsorbent is a material for adsorbing at least nitrogen from air, wherein said gaseous mixture is air, and wherein said second component is oxygen.

11. In a heatless fractionating apparatus for fractionating a gaseous mixture containing at least first and second components, first and second bodies of adsorbent for adsorbing at least said first component but not said second component, a first vessel containing said first body, a second vessel containing said second body, means for pressurizing the gaseous mixture containing said first and second components, means for passing the pressurized gaseous mixture alternately through said first and second bodies to effect the adsorption of said first component alternately in said first and second bodies, a third vessel, first conduit means connecting said first and second vessels to said third vessel to provide for the flow of unadsorbed gas from each of said first and second vessels to said third vessel for collection therein, valve means in said first conduit means, said valve means, when opened, allowing the unadsorbed gas to flow through said first conduit means to said third vessel, and said valve means, upon being closed, blocking flow of unadsorbed gas from said first and second vessels to said third vessel, further means for purging the second component from said first and second bodies, said further means comprising second conduit means connected intermediate said first and second vessels for (a) diverting a portion of the unadsorbed gas leaving said first body for flow through said second body when said valve means is open and during the passage of the pressurized gaseous mixture through said first body and (b) diverting a portion of the unadsorbed gas leaving said second body for flow through said first body when said valve means is opened and during passage of the pressurized gaseous mixture through said second body, and time responsive means for keeping said valve means closed for a pre-selected time period when delivery of the pressurized gaseous mixture to said bodies is initiated to (a) divert all of the unadsorbed gas leaving said first body to flow through said second body for purging the first component from said second body during passage of the pressurized gaseous mixture through said first body and (b) divert all of the unadsorbed gas leaving said second body to flow through said first body for purging the first component from said first body during passage of the pressurized gaseous mixture through said second body.

12. In a heatless fractionating apparatus for fractionating a gaseous mixture having at least first and second components, first and second confined bodies of adsorbent for adsorbing at least said first component, but not said second component, first means for delivering the gaseous mixture alternatively to said first and second bodies for alternate passage through said bodies to provide for the adsorption of the first component alternately in said first and second bodies such that unadsorbed gas leaving said bodies contains said second component, second means for alternately purging said first and second bodies of the adsorbed component during the intervals in which the gaseous mixture is not being passed through the bodies, a storage vessel, third means for delivering at least a portion of the unadsorbed gas leaving said bodies to said vessel for collection therein, an outlet line connected to said third vessel to provide for the passage of the collected unadsorbed gas from said storage vessel, and fourth means rendered effective by the termination of the delivery of said gaseous mixture to both of said bodies for causing the unadsorbed gas in said storage vessel to flow through at least one of said bodies for purging said at least one of said bodies of said first component.

13. The heatless fractionating system defined in claim 12 including a first vessel containing said first body, and a second vessel containing said second body, said fourth means including conduit means connected between the outlet of said storage vessel and said first and second vessels, and valve means in said conduit means and said outlet line, said valve means being rendered effective upon terminating the delivery of the gaseous mixture to said bodies to (a) block flow of gas through said outlet line and (b) enable the unadsorbed gas in said storage vessel to flow through said conduit means and said first and second vessels to purge said bodies of said first component.

14. The heatless fractionating apparatus defined in any one of the preceding claims 12-13 wherein said adsorbent is a material for adsorbing at least nitrogen from air, wherein said gaseous mixture is air, and wherein said second component is oxygen.

15. In a heatless fractionating apparatus for fractionating a gaseous mixture having at least first and second components, first and second vessels each containing an adsorbent for adsorbing at least said first component, but not said second component, means for pressurizing the gaseous mixture containing said first and second components, a receptacle, a fluid-conveying system connecting said first and second vessels in parallel between said pressurizing means and said receptacle and having an inlet portion connected between said pressurizing means and said first and second vessels for directing the pressurized gaseous mixture to said first and second vessels, first valve means connected in said inlet portion at a location where (a) the opening of said first valve means provides for the delivery of the pressurized gaseous mixture to said first vessel for passage through the adsorbent in said first vessel and (b) the closing of said first valve means blocks delivery of the pressurized gaseous mixture to said first vessel, second valve means connected in said inlet portion at a location where (a) the opening of said second valve means provides for the delivery of the pressurized gaseous mixture to said second vessel for passage through the adsorbent in said second vessel and (b) the closing of said second valve means blocks delivery of the pressurized gaseous mixture to said second vessel, the passage of the gaseous mixture through the adsorbent in each of said first and second vessels providing for the adsorption of said first component such that unadsorbed gas containing said second component passes out of said first and second vessels, said fluid conveying system having an outlet portion connected between said first and second vessels and said receptacle for directing the unadsorbed gas from said first and second vessels to said receptacle, a transducer for sensing fluid pressure and for converting the sensed fluid pressure into an electrical signal, said transducer being connected to said fluid conveying system to sense the gas pressure at a single location where said signal (a) varies as a function of the gas pressure in said first vessel during delivery of the pressurized gaseous mixture to said first vessel, and (b) varies as a function of the gas pressure in said second vessel during delivery of the pressurized gaseous mixture to said second vessel, and means under the control of said signal for alternately opening said first and second valve means to provide for delivery of the pressurized gaseous mixture alternately to said first and second vessels such that the switchover of the pressurized gaseous mixture from one vessel to the other is dependent upon the gas pressure in the vessel in which adsorption of said first component is taking place.

16. The heatless fractionating apparatus defined in claim 15 wherein said transducer is connected to sense the gas pressure in said inlet portion upstream from said first and second valve means, and wherein said inlet portion comprises first and second branch lines and an inlet line, aid inlet line being common to said branch lines and being connected between said pressurizing means and said branch lines for conveying the pressurized gaseous mixture to said branch lines, said first valve means being connected in said first branch line, and said second valve means being connected in said second branch line, said first branch line being connected to said first vessel to provide for the passage of the pressurized gaseous mixture to said first vessel when said first valve means is opened, and said second branch line being connected to said second vessel to provide for the passage of the pressurized gaseous mixture to said second vessel when said second valve means is opened.

17. The heatless fractionating apparatus defined in any one of the preceding claims 15 and 16 wherein said adsorbent is a material for adsorbing at least nitrogen from air, wherein said gaseous mixture is air, and wherein said second component is oxygen.

18. In a heatless fractionating apparatus for fractionating a gaseous mixture having at least first and second vessels each containing an adsorbent for adsorbing at least said first component but not said second component, means for pressurizing the gaseous mixture containing said first and second components, a fluid conveying outlet line, a fluid conveying system connecting said first and second vessels in parallel between said pressurizing means and said outlet line and having an inlet portion connected between said pressurizing means and said first and second vessels for directing the pressurized gaseous mixture to said first and second vessels, first valve means connected in said inlet portion at a location where (a) the opening of said first valve means provides for the delivery of the pressurized gaseous mixture to said first vessel for passage through the adsorbent in said first vessel, and (b) the closing of said first valve means blocks delivery of the pressurized gaseous mixture to said first vessel, second valve means connected in said inlet portion at a location where (a) the opening of said second valve means provides for the delivery of the pressurized gaseous mixture to said second vessel for passage through the adsorbent in said second vessel, and (b) the closing of said second valve means blocks delivery of said pressurized gaseous mixture to said second vessel, the passage of the gaseous mixture through the adsorbent in each of said first and second vessels providing for the adsorption of said first component such that unadsorbed gas containing said second component passes out of said vessels, said fluid conveying system having an outlet portion connected between said vessels and said outlet line for directing the unadsorbed gas from said vessels to said outlet line, means for alternately opening said first and second valve means, first depressurizing means for depressurizing said first vessel upon closure of said first valve means, and second depressurizing means for depressurizing said second vessel upon closure of said second valve means, said first depressurizing means comprising third valve means connected in said inlet portion between said first valve means and said first vessel, and said second depressurizing means comprises fourth valve means connected in said inlet portion between said second valve means and said second vessel, said third valve means being responsive to the gas pressure in said first vessel upon closure of said first valve means to vent the gas from said first vessel, and said fourth valve means being responsive to the gas pressure in said second vessel upon closure of said second valve means to vent the gas from second vessel.

19. In a heatless fractionating apparatus for fractionating a gaseous mixture having at least first and second components, first and second vessels, means for pressurizing the gaseous mixture containing said components, means for passing the pressurized gaseous mixture alternately through said first and second vessels, adsorbents in said vessels for adsorbing at least said first component but not said second component from the pressurized gaseous mixture as the pressurized gaseous mixture passes through said vessels, said means for passing the pressurized gaseous mixture alternately through said first and second vessels comprising valve means which, upon closure, block delivery of the pressurized gaseous mixture to said vessels, and pressure responsive means connected downstream from said valve means and conditioned by the closure of said valve means for depressurizing said first and second vessels.

20. In a fractionating apparatus for fractionating a gaseous mixture having at least first and second components, first and second vessels, first means including electrically operated valve means providing for the delivery of the gaseous mixture containing said components alternately to said first and second vessels for passage alternately through said first and second vessels, adsorbents in said vessels for adsorbing at least said first component but not said second component from the gaseous mixture as the gaseous mixture passes through said vessels, second means for purging the components adsorbed by the adsorbent in each vessel during the intervals when the gaseous mixture is not being delivered to the vessel, and third means for giving an alarm when electrical power for operating said valve means is lost, said electrically operated valve means comprising (a) a first valve which, upon opening, provides for the passage of the gaseous mixture to said first vessel and which upon closing, blocks passage of the gaseous mixture to said first vessel, and (b) a second valve which, upon opening, provides for the passage of the gaseous mixture to said second vessel and which, upon closing, blocks passage of the gaseous mixture to said second vessel, said first means further including electrical control means for alternately opening said first and second valves, the electrical power for operating said first and second valves being supplied by a power source external to the fractionating apparatus, and said third means comprising at least one alarm device for producing an alarm, and battery means for powering said alarm device independently of said power source, whereby power for operating the alarm device is provided even though the power from said power source is lost.

21. The fractionating apparatus defined in claim 20 including means for energizing said alarm device for a preselected time interval when power is first applied to initiate operation of said first means to deliver the gaseous mixture to said vessels.

22. The fractionating apparatus defined in any one of the preceding claims 20 or 21 including means for operating said alarm device to give an alarm in the event that said first means fails to switch delivery of the gaseous mixture from one vessel to the other within a preselected time period.

23. The fractionating apparatus defined in claim 22 wherein said alarm device supplies a first alarm signal in the event that power from said power source is lost, there being additional means for causing said alarm device to supply a second alarm signal in the event that first means fails to switch delivery of the gaseous mixture from one vessel to the other within a pre-selected time period, said second signal having a characteristic that distinguishes it from said first signal.

24. The heatless fractionating apparatus defined in any one of the preceding claims 20 or 21 wherein said adsorbent is a material for adsorbing at least nitrogen from air, wherein said gaseous mixture is air, and wherein said second component is oxygen.

25. In a fractionating system for fractionating a gaseous mixture having at least first and second components, first and second vessels, first means for delivering the gaseous mixture containing said components alternately to said first and second vessel for passage alternately through said vessels, adsorbents in said vessels for absorbing at least said first component, but not said second component as the gaseous mixture passes through said vessels, second means for purging the components adsorbed by the adsorbent in each vessel during the intervals in which the gaseous mixture is not being delivered to the vessel, third means for giving an alarm in response to the occurrence of at least one pre-selected alarm condition and including an electrically operated alarm device for supplying an alarm signal, and battery means for supplying the electrical power to operate said alarm device, said third means including means responsive to initiating operation of said first means to deliver the gaseous mixture to said vessels for causing said alarm device to supply said alarm signal for a pre-selected time period even though said alarm condition is not present.

26. In a fractionating apparatus for fractionating a gaseous mixture having at least first and second components, first and second adsorbent beds for adsorbing at least said first component, but not said second component from said gaseous mixture, means for pressurizing said gaseous mixture, means for effecting the passage of the pressurized gaseous mixture alternately through said first and second beds to provide for the adsorption of said first component, first conduit means providing for the passage of the unadsorbed gas containing said second component away from said beds, and second conduit means establishing fluid communication between said beds to provide for the delivery of unadsorbed gas from each bed to the other for purging adsorbed components therein, and time responsive means for diverting all of the unadsorbed gas leaving each of said beds to flow through said second conduit means for a pre-selected time period commencing with the delivery of the pressurized gaseous mixture to said beds at start-up of the fractionating apparatus, whereby all of the unadsorbed gas leaving said first bed during said time period is directed to said second bed for purging adsorbed components therefrom, and all unadsorbed gas leaving said second bed during said time period is directed to said first bed to purge adsorbed components therefrom.

27. In a heatless fractionating apparatus for fractionating a gaseous mixture having at least first and second components, first and second confined bodies of adsorbent for adsorbing at least said first component, but not said second component, first means for delivering the gaseous mixture alternately to said first and second bodies for alternate passage through said bodies to provide for the adsorption of the first component alternately in said first and second bodies such that unadsorbed gas leaving said bodies contains said second component, second means for alternately purging said first and second bodies of the adsorbed component during the intervals in which the gaseous mixture is not being passed through the bodies, a storage vessel, third means for delivering at least a portion of the unadsorbed gas leaving said bodies to said vessel for collection therein, an outlet line connected to said third vessel to provide for the passage of the collected unadsorbed gas from said storage vessel, fourth means rendered effective upon terminating the delivery of said gaseous mixture of said bodies for causing the unadsorbed gas in said storage vessel to flow through at least one of said bodies for purging said at least one of said bodies of said first component, a first vessel containing said first body, a second vessel containing said second body, said fourth means including conduit means connected between the outlet of said storage vessel and said first and second vessels, first valve means in said conduit means and said outlet line, and second valve means in said conduit means, said first valve means being rendered effective upon the termination of the delivery of the gaseous mixture to said bodies to (a) block flow of the unadsorbed gas through said outlet line, and (b) to enable the unadsorbed gas in said storage vessel to flow into said conduit means, and said second valve means being responsive to the gas pressures in said first and second vessels to cause all of the unadsorbed entering said conduit means from said first valve means to flow through just that one of said first and second vessels in which the pressurized gaseous mixture was flowing at the time when the delivery of the gaseous mixture of said bodies was terminated.

28. In a heatless fractionating apparatus for fractionating a gaseous mixture having at least first and second components, first and second vessels, means for pressurizing the gaseous mixture containing said components, means for passing the pressurized gaseous mixture alternately through said first and second vessels, adsorbents in said vessels for adsorbing at least said first component but not said second component from the pressurized gaseous mixture as the pressurized gaseous mixture passes through said vessels, said means for passing the pressurized gaseous mixture alternately through said first and second vessels comprising first and second valve means, said first valve means being connected between said pressurizing means and said first vessel and being closable to block delivery of the pressurized gaseous mixture to said first vessel, said second valve means being connected between said pressurizing means and said second vessel and being closable to block the delivery of the pressurized gaseous mixture to said second vessel, first pressure responsive means connected between said first valve means and said first vessel and conditioned by the closure of said first valve means for depressurizing said first vessel, and second pressure responsive means connected between said second valve means and said second vessel and conditioned by the closure of said second valve means for depressurizing said second vessel.

29. In a heatless fractionating apparatus for fractionating a gaseous mixture having at least first and second components, at least one vessel, means for pressurizing the gaseous mixture containing said components, a first valve connected intermediate said pressurizing means and said vessel and having first and second fluid flow ports and a valve closure member disposed between said ports, a second valve disposed upstream of said first port and downstream of said pressurizing means, control means for cyclically opening and closing said second valve to intermittently deliver the pressurized gaseous mixture to said first port, said first valve having its second port in fluid communication with the interior of said vessel, and said closure member being responsive to the pressure of the pressurized gaseous mixture delivered to said first port to provide for the delivery of the pressurized gaseous mixture through said second port to said vessel for flow through said vessel, said vessel containing an adsorbent for adsorbing at least first component but not said second component of said gaseous mixture as the gaseous mixture flows through said vessel, and said closure member further being responsive to gas pressure in said vessel to provide for the venting of gases from said vessel whenever the gas pressure in said vessel exceeds the gas pressure at said first port.

30. The heatless fractionating system defined in claim 29, including means in fluid communication with said first port for reducing the gas pressure at said first port to a value below the gas pressure in said vessel whenever said second valve is closed to block delivery of the pressurized gaseous mixture to said first port.

31. The heatless fractionating apparatus defined in claim 30 wherein said second valve is in fluid communication with said first port through a fluid flow passage for delivering the pressurized gaseous mixture to said first port, and wherein said pressure-reducing means is connected to bleed the gases in said flow passage to atmosphere.

32. The heatless fractionating apparatus defined in claim 30 wherein said second valve is in fluid communication with said first port through a fluid flow passage for delivering the pressurized gaseous mixture to said first port, and wherein said pressure-reducing means comprises an orifice connected to said fluid flow passage for bleeding the gases in said fluid flow passage to atmosphere.

33. The heatless fractionating apparatus defined in any one of the preceding claims 30–32 wherein said second valve is a solenoid operated valve having a solenoid operator, wherein said control means comprises an electrical circuit for intermittently energizing said solenoid operator, said second valve being opened by energization of said solenoid operator such that removal of electrical power from said circuit results in the closure of said second valve, whereby said first valve is effective through operation of said pressure-reducing means to vent gases from said vessel whenever electrical power is removed from said electrical circuit.

34. The heatless fractionating apparatus defined in any one of the preceding claims 29–32 wherein said first valve is provided with an exhaust passage, and wherein said closure member responds to the gas pressure in said vessel whenever it exceeds the gas pressure at said first port to establish fluid communication between said exhaust passage and said second port for venting gases from said vessel while blocking flow of gas through said first port.

35. The heatless fractionating apparatus defined in any one of the preceding claims 29–30 wherein the pressurized gaseous mixture is directed to flow in a first direction through said adsorbent, said heatless fractionating apparatus further including means for introducing a purge gas into said vessel during intervals in which delivery of the pressurized gaseous mixture to said vessel is stopped, said purge gas being directed to flow through said adsorbent in a direction that is countercurrent to said first direction, and said purge gas containing at least said second component to effect the desorption of said first component from said adsorbent, said closure member being displaceable to a position for venting said purge gas from said vessel during the intervals in which the delivery of pressurized gaseous mixture to said first port is blocked.

* * * * *